Figures 1, 2:
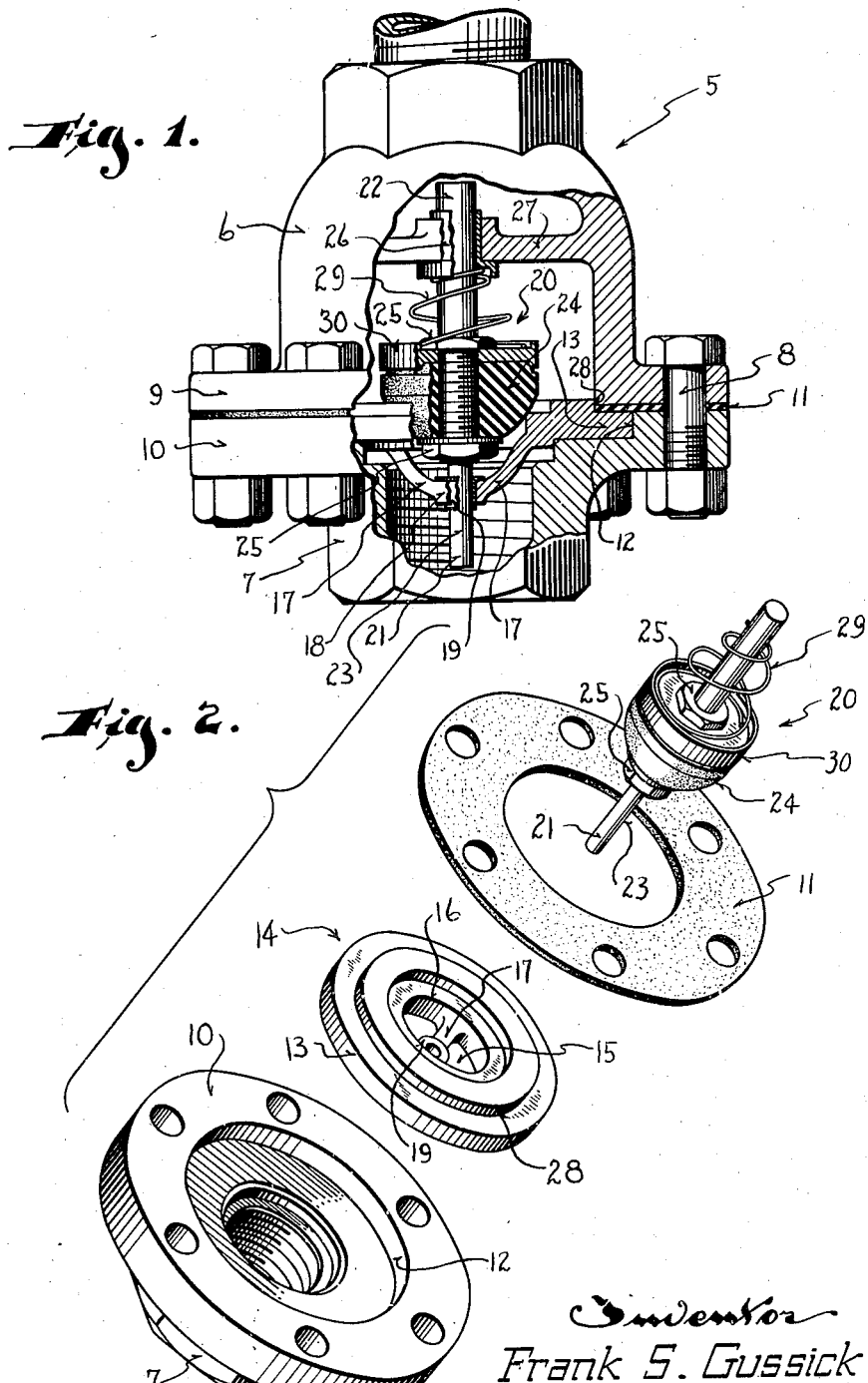

Nov. 10, 1942.　　　F. S. GUSSICK　　　2,301,276

VALVE

Filed Jan. 17, 1941

Inventor
Frank S. Gussick

Patented Nov. 10, 1942

2,301,276

UNITED STATES PATENT OFFICE 2,301,276

VALVE

Frank S. Gussick, Milwaukee, Wis.

Application January 17, 1941, Serial No. 374,798

1 Claim. (Cl. 251—144)

This invention relates to certain new and useful improvements in valves and refers particularly to check valves.

Inasmuch as the efficacy of a valve depends largely upon the condition of its seat, and as the wear on the valve seat, in many types of service is excessive, valves have been constructed in the past with removable seats. However, in such valves heretofore proposed, the replacement of a worn valve seat occasioned so much work and trouble that it was seldom done.

It is, therefore, an object of this invention to provide a valve wherein the valve seat is not only removable but wherein its removal and replacement can be effected within a few minutes and without the use of tools other than a wrench needed to undo the bolts which hold the sectional housing together.

More specifically, it is an object of this invention to provide a valve and particularly a check valve having a removable seat held in place merely by being clamped between two complementary housing sections so that upon disassembly of the housing the valve seat is loose for immediate and direct removal.

Another object of this invention is to provide an exceedingly simple but effective manner of accurately aligning the valve seat with the valve body so that a valve plug guided in bearings carried by the body and the valve seat is accurately aligned with the valve seat.

It is also an object of this invention to provide a check valve so constructed that the direction of flow through the valve is never changed to thereby reduce friction to a minimum.

Another object of this invention is to provide a check valve so designed that it may be placed in a pipe line at any angle.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawing illustrates one complete example of the physical embodiment of the invention constructed according to the best mode so far devised for the practical application of the principles thereof, and in which:

Figure 1 is a view partially in side elevation and partially in transverse section, showing a valve constructed in accordance with this invention; and Figure 2 is a perspective view of all of the parts of the valve, excepting one of the housing sections, shown disassembled and in their proper order of assembly.

Referring now more particularly to the accompanying drawing in which like numerals indicate like parts throughout the several views, the numeral 5 designates the housing or body of the valve. This housing is composed of two complementary sections 6 and 7 held together by bolts 8.

The section 6 forms substantially a hollow bonnet, while the section 7 may be considered a base. Both have internally threaded ports to enable their attachment to pipe ends so that the valve may be mounted in a pipe line. To facilitate attachment to such pipe ends, the extremities of the sections preferably have an hexagonal external shape.

The meeting faces of the sections have annular flanges 9 and 10 through which the bolts 8 pass. These flanges have flat opposed faces between which a gasket 11 is interposed to insure a fluid tight juncture.

The flange 10 of the base section 7 has a counterbore 12 to receive a flange 13 on a valve seat, designated generally by the numeral 14. This valve seat is formed of metal and comprises an annular rim providing the flange 13 and encircling a valve port 15, one edge 16 of which provides the valve seat proper. This edge is slightly chamfered so that the actual seat has a conical surface approximately 1/64 of an inch long.

Extending radially inward and longitudinally outward from the opposite edge of the port 15 are two arms 17 joined in a hub 18. A bushing 19 is secured in a bore through the hub to provide a valve stem bearing. It is to be observed that this bearing is disposed substantially within the threaded port or bore of the base section 7 so that the actual valve seat faces the interior of the bonnet-like section 6.

The flange 13 of the valve seat has a thickness substantially equal to the depth of the counterbore 12 so that its outer face is flush with the flat face of the flange 10 and inasmuch as the gasket 11 has an area substantially coextensive with the flat face of the flange 9 which overhangs the counterbore a substantial distance, the gasket extends across the juncture between the cylindrical wall of the counterbore and the outer wall of the flange 13.

The gasket thus not only seals the juncture between the housing sections, but also prevents leakage around the edge of the valve seat.

Disposed within the hollow of the bonnet-like section 6 is a valve plug designated generally by the numeral 20. This valve plug comprises a stem 21 having smooth large and small end portion 22 and 23, and a "ball" 24 of rubber or other suitable non-metallic substance mounted on the stem. While the securement of the "ball" 24 to the stem may be effected in any suitable manner, it is readily removably affixed to the stem by confining the same between two jam nuts 25 on a threaded medial portion of the stem, metal washers being provided between the jam nuts and the adjacent ends of the "ball."

The small diameter end portion of the valve stem is slidably guided in the bearing formed by the bushing 19 which, being carried by the valve seat, is accurately aligned with the valve seat proper.

The large diameter end 22 of the valve stem is guided in a bearing 26 supported in the bonnet-like housing section 6 by radial arms 27. To insure accurate alignment between the bearings, an annular shoulder 28 is formed on the valve seat to snugly engage the adjacent wall of the bore in the bonnet-like section 6 which is accurately finished at least at its outer end portion to be exactly coaxial with the bearing 26. Hence, it will be seen that although the valve seat, which carries one of the bearings, is removable from the housing section which carries the other bearing, absolute coaxially is assured between the bearings at all times.

Inasmuch as the valve seat proper has but a narrow surface, and as the surface of the "ball" 24, which engages the valve seat is rounded or spherical as shown, it will be apparent that the area of engagement is very small. Consequently, there is small likelihood of sediment accumulating on the valve seat to interfere with proper seating, and as the "ball" is formed of non-metallic material, preferably rubber, the valve is silent in operation.

A light coil spring 29 confined between the bearing 26 and the metal washer 30, which covers the adjacent end of the "ball," yieldingly urges the valve plug to its closed position so that the valve is self-closing.

A particular advantage of the present construction is that the direction of flow is not changed during the passage of fluid through the valve for not only are the inlet and outlet ports of the valve coaxially aligned, but the valve port itself is likewise coaxial with the inlet and outlet ports.

It is also to be noted that the "ball" of the valve plug is replaceable merely by loosening one of the jam nuts and that the removal of the valve seat requires no tools other than a wrench or the like to undo the bolts which clamp the housing sections together.

Removal and replacement of the "ball" of the valve plug is equally as simple.

Attention is also directed to the fact that inasmuch as all parts of the valve subject to wear are readily replaceable, the valve will last practically a lifetime.

What I claim as my invention is:

In a valve: a housing comprising coaxial complementary sections having communicating hollow interiors and opposed flat faces, one of the sections having a counterbore opening to its flat face; an annular flange received in said counterbore and having a thickness substantially equal to the depth of the counterbore, said flange having a port through its center, one peripheral edge of which is substantially sharp and constitutes the valve seat proper; the flat face of the other section extending inwardly over the valve seat flange; a gasket interposed between the flat faces of the sections and being substantially coextensive in area with the flat face of the second-designated section so as to extend over the juncture between the circular wall of the counterbore and the adjacent edge of the valve seat flange; detachable means for clamping the housing sections together to compress the gasket; a valve plug having a convex outer surface engageable with the valve seat with a substantially line contact, said valve plug being movable axially to and from a valve closed position with its convex outer surface engaging the seat; means for guiding the valve plug for proper engagement with the valve seat including a stem projecting from opposite sides of the plug axially of the aligned hollow interiors of the sections so that its ends project into the interiors of said sections; a bearing in the hollow body of each section to receive the ends of the stem therein, the bearing in one of said sections being carried by the annular flange and the other bearing being carried by the remaining housing section; and means on the flange engageable with a machined portion of the housing section carrying the bearing to hold the flange and its bearing in exact coaxial alignment with the housing carried bearing.

FRANK S. GUSSICK.